(12) United States Patent
Raman et al.

(10) Patent No.: US 8,671,137 B2
(45) Date of Patent: Mar. 11, 2014

(54) PERSONALIZED ACCESS USING NEAR FIELD COMMUNICATION

(75) Inventors: Tiruvilwamalai Venkatraman Raman, San Jose, CA (US); Charles Chen, San Jose, CA (US)

(73) Assignee: Google Inc., Mountain View, CA (US)

( * ) Notice: Subject to any disclaimer, the term of this patent is extended or adjusted under 35 U.S.C. 154(b) by 6 days.

(21) Appl. No.: 13/149,294

(22) Filed: May 31, 2011

(65) Prior Publication Data

US 2012/0311019 A1     Dec. 6, 2012

(51) Int. Cl.
*G06F 15/16*     (2006.01)
*G06F 12/00*     (2006.01)

(52) U.S. Cl.
USPC .......................................... 709/203; 709/248

(58) Field of Classification Search
USPC ........................... 709/203, 225–229, 250, 248
See application file for complete search history.

(56) References Cited

U.S. PATENT DOCUMENTS

| | | | |
|---|---|---|---|
| 7,644,039 B1 | 1/2010 | Magee et al. | |
| 8,150,915 B1 * | 4/2012 | Raman et al. | 709/203 |
| 2001/0021176 A1 * | 9/2001 | Mimura et al. | 370/235 |
| 2008/0242271 A1 * | 10/2008 | Schmidt et al. | 455/414.1 |
| 2009/0111378 A1 * | 4/2009 | Sheynman et al. | 455/41.1 |
| 2009/0271447 A1 * | 10/2009 | Shin et al. | 707/201 |
| 2010/0021176 A1 | 1/2010 | Holcombe et al. | |
| 2010/0026454 A1 * | 2/2010 | Rowse et al. | 340/10.1 |
| 2010/0068997 A1 * | 3/2010 | Dunko | 455/41.1 |
| 2010/0078472 A1 * | 4/2010 | Lin et al. | 235/379 |
| 2010/0082481 A1 * | 4/2010 | Lin et al. | 705/41 |
| 2010/0130240 A1 * | 5/2010 | Hart | 455/509 |
| 2011/0243449 A1 * | 10/2011 | Hannuksela et al. | 382/190 |

FOREIGN PATENT DOCUMENTS

| | | |
|---|---|---|
| EP | 1134705 | 9/2001 |
| EP | 2450858 | 9/2012 |
| JP | 2010271779 | 2/2010 |

OTHER PUBLICATIONS

Koichi Takeuchi, Hitoni yasashii gijutsu, OKI Technical Review, OKI Electric Industry Co. Ltd., Jul. 1, 2004, vol. 71, No. 3, p. 62-65.

* cited by examiner

*Primary Examiner* — Zarni Maung
(74) *Attorney, Agent, or Firm* — Morris & Kamlay LLP

(57) ABSTRACT

Methods and systems for personalizing access to client devices using near field communication is disclosed. In a transaction between a client and a server, the client may detect the presence of a computing device using near field communication, and the device may be identified as an assistive computing device. Based on this information, the client may send the assistive computing device user interface data such that the transaction can be completed on the assistive computing device instead of the client.

23 Claims, 5 Drawing Sheets

PERSONALIZED ACCESS USING NEAR FIELD COMMUNICATION

BACKGROUND

1. Field

This disclosure relates to personalizing access using near field communication to interact with client devices.

2. Background

Users with special needs, such as users with vision loss, motion loss, or hearing loss, often encounter difficulties when interacting with everyday public information devices such as automatic teller machines, airport ticket kiosks, and other such devices. For example, a standard automatic teller machine (ATM; may be easy to use for most people, but for those without vision, a combination of audio and Braille is often used to facilitate a transaction with the ATM. While similar accommodations may make transactions with other public information devices possible, such transactions may take a much longer time than typical situations.

BRIEF SUMMARY

Implementations relate to methods and systems for delegating user interaction for a transaction between a client and a server. The presence of a computing device may be detected using near field communication. Upon detecting the presence of the device, the computing device may be identified as an assistive computing device. User interface data may be sent from the client to the assistive computing device such that the assistive computing device is provided user interaction functionality. The user interaction for the transaction may occur with the assistive computing device instead of the client.

A method for modifying user interaction for a transaction on a client device is disclosed. The presence of a computing device is detected using near field communication. Data indicating a user preference for presentation of data is automatically received from the computing device. In accordance with the received data, further data presentation on the client is modified.

A further method, device, and computer readable storage medium are disclosed for delegating user interaction to an assistive computing device for a transaction between a client and a server. The assistive computing device may transmit data to a client using near field communication. The data may identify capabilities of the assistive computing device or may include data identifying the device to the client as an assistive computing device. The assistive computing device may receive user interface data from the client, such that the assistive computing device is provided user interaction functionality for the transaction. The assistive computing device may then use its capabilities to allow for user interaction for the transaction to the user of the assistive computing device. A device may include a processor and a memory storing instructions which cause the processor to perform the above operations.

Further implementations, features, and advantages of the invention, as well as the structure and operation of the various implementations of the invention are described in detail below with reference to accompanying drawings.

BRIEF DESCRIPTION OF THE DRAWINGS/FIGURES

Implementations are described with reference to the accompanying drawings. In the drawings, like reference numbers may indicate identical or functionally-similar elements. The drawing in which an element first appears is generally indicated by the left-most digit in the corresponding reference number.

DETAILED DESCRIPTION

Figure 1:
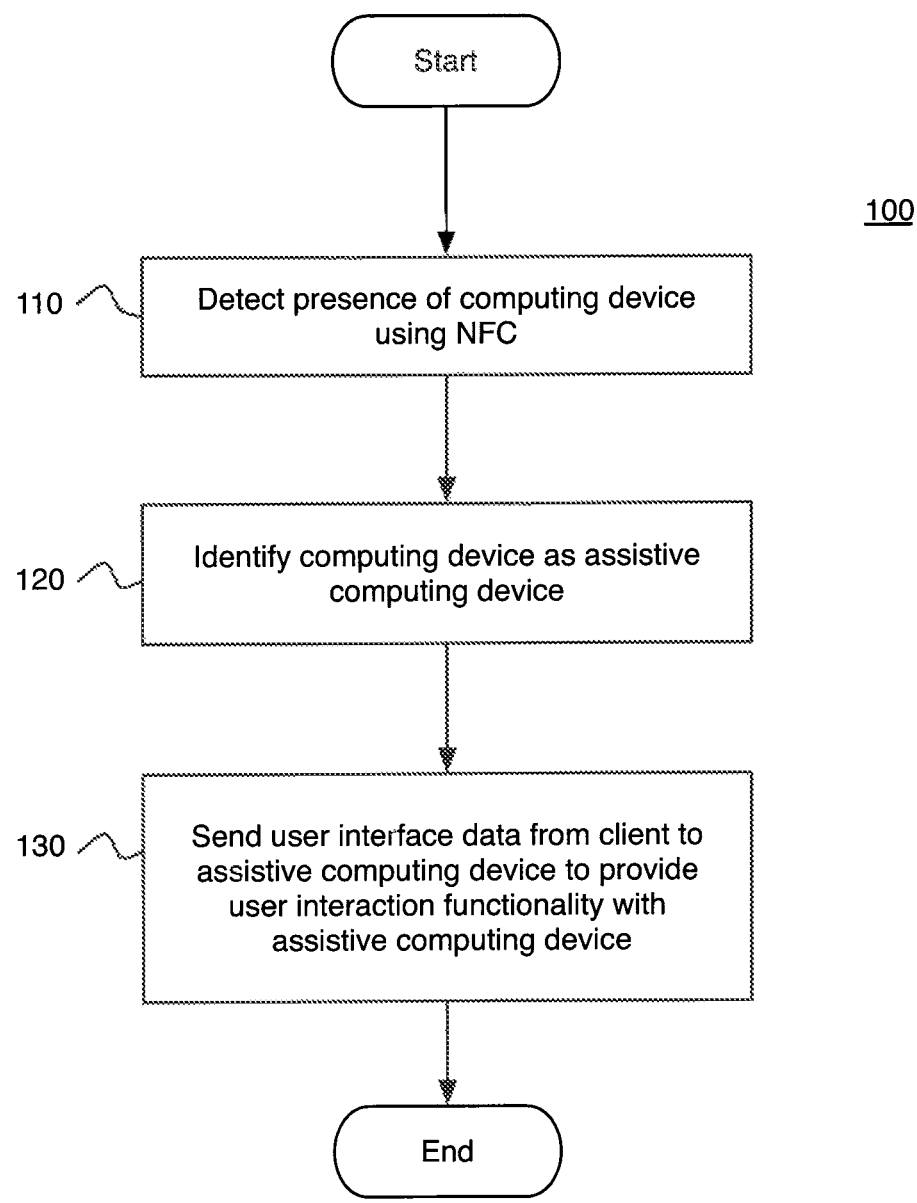
FIG. 1 is a flow diagram of a process for delegating user interaction for a transaction.

While implementations are described herein with reference to particular applications, it should be understood that the disclosure is not limited thereto. Those skilled in the art with access to the teachings provided herein will recognize additional modifications, applications, and implementations within the scope of the present disclosure and additional fields in which the implementations would be of significant utility.

In the detailed description of implementations that follows, references to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it would be within the knowledge of one skilled in the art to effect such feature, structure, or characteristic in connection with other implementations whether or not explicitly described.

As small computing devices, such as mobile telephones or tablets, increase in popularity, users who are affected with vision impairment, motion impairment, hearing impairment, or other similar impairments often carry highly specialized assistive computing devices. For example, a blind user, meaning a user with no sight or with only very limited sight, may carry a specialized mobile telephone or tablet computer with screen reading functionality built into the device. The screen reading functionality may be customized by the user to speak at a given speed and in a desired tone. Further, the device may be trained to recognize the user's voice with a high degree of accuracy. Similarly, hearing-impaired users may have devices personalized to their needs that provide visual instead of auditory cues in certain situations. Motion impaired users may have personalized devices with advanced voice or speech recognition capabilities tuned to particular users.

Such specialized devices vastly improve the level of access to the physical world afforded to users requiring the assistance of such specialized devices. However, in an increasingly electronic world, public client devices that serve as access points for services, such as information kiosks or other terminals, are necessary to access information, for example, at an airport. These public client devices often are not equipped with the adaptive technologies and peripherals needed to provide full access to users with impairments as described above. At the same time, these users often carry highly personalized devices with them at all times, as described above.

Near field communication (NFC) is a technology that uses short-range wireless transmission over a distance of approximately 4 cm or less to communicate data. Near field communication chips are typically small, and may be embedded in devices such as mobile telephones, tablet computers, and laptop computers. For example, certain mobile devices include NFC chips and appropriate supporting software to enable data transmission using NFC.

Public client devices, such as automatic teller machines, airport kiosks, subway fare machines, and other such client devices typically communicate with a server to complete a transaction. For example, an airport kiosk may communicate with an airline's central server to issue boarding passes, retrieve information such as seat assignments, or to charge customer credit cards for baggage fees, among other functions. The kiosk interface may be provided by a web page to display a user interface, which is used to communicate with a web server. Similarly, an automatic teller machine may communicate with a bank's servers. In their standard configuration, however, such public information devices are not equipped with technologies that allow full access to users with special needs.

In order to leverage the additional capability of highly personalized assistive computing devices and bridge the gap between public client devices such as airport kiosks and such highly personalized assistive computing devices, NFC chips may be embedded in public client devices so that near field communication may be used to delegate user interaction to the assistive computing device instead of the public client device.

FIG. 1 is a flow diagram of an exemplary process 100 for delegating user interaction for a transaction between a client and a server.

At block 110, the presence of a computing device is detected using near field communication. For example, an airport kiosk with an embedded NFC chip may detect the presence of a mobile telephone with an embedded NFC chip when the mobile telephone is placed near the kiosk.

At block 120, the computing device is identified as an assistive computing device. For example, when the kiosk detects the presence of the mobile telephone, it may request data from the mobile telephone and use this data to identify whether the device is an assistive computing device. Alternatively, the device may automatically send data identifying itself as an assistive computing device to the client.

At block 130, user interface data is sent from the client to the assistive computing device. The user interface data may provide user interaction functionality to the assistive computing device, such that user interaction for the transaction may occur with the assistive computing device instead of the client.

The user interface data may include a Uniform Resource Locator (URL), such as the address of a website on the Internet. The URL may provide a link to an interface that directly communicates with a server. For example, the URL may provide a link to an interface that mimics what would otherwise be displayed on the airport kiosk. The user interface data may cause the assistive computing device to read a selection of available seats for a flight using screen reading software, allow the user to check a bag, or present other options for the user's flight. The user interface data may also cause the assistive computing device to execute a series of commands, or open an application, to provide user interaction functionality to the assistive computing device.

The assistive computing device may send a signal to the client that a transaction is complete. Thus, for example, after an airport kiosk sends a URL to an assistive computing device to facilitate a user's seat selection and other tasks, such as checking bags or purchasing a seat upgrade, upon performing the tasks, the assistive computing device may send the kiosk a signal, using near field communication, that the transaction is complete. The signal that the transaction is complete may also be received from the server which is interacting with the assistive computing device. The kiosk may then perform another action, such as printing out a receipt or boarding pass, which finalizes the transaction. Depending on the particular transaction, an additional action may or may not be necessary.

State data may be received from the assistive computing device and synchronized with the client, for example, to allow others to view the progress of a transaction where interaction has been delegated to an assistive computing device. For example, checking in for a flight on a typical kiosk may require two or more steps. At each step, data representing a current position of the checking in process may be received from the assistive computing device. This data may be updated on the client device. This may be useful, for example, if a vision impaired user is traveling with a friend. Upon receiving state data from the assistive computing device and synchronizing the state data, the kiosk may update its own display of the check-in progress, and the user's friend may be able to see the progress of the transaction. State data may also be received from the server and synchronized with the client.

Upon identifying the computing device as an assistive computing device, data may be received from the assistive computing device to skip or eliminate steps of the transaction. As an example, a user may have an electronic copy of his flight confirmation stored on his assistive computing device. An airport kiosk may receive this data from the assistive computing device to skip particular steps of the checking in process. User interface data may be sent to the assistive computing device that automatically places the user at the first position in the process that requires user input.

Figure 2:
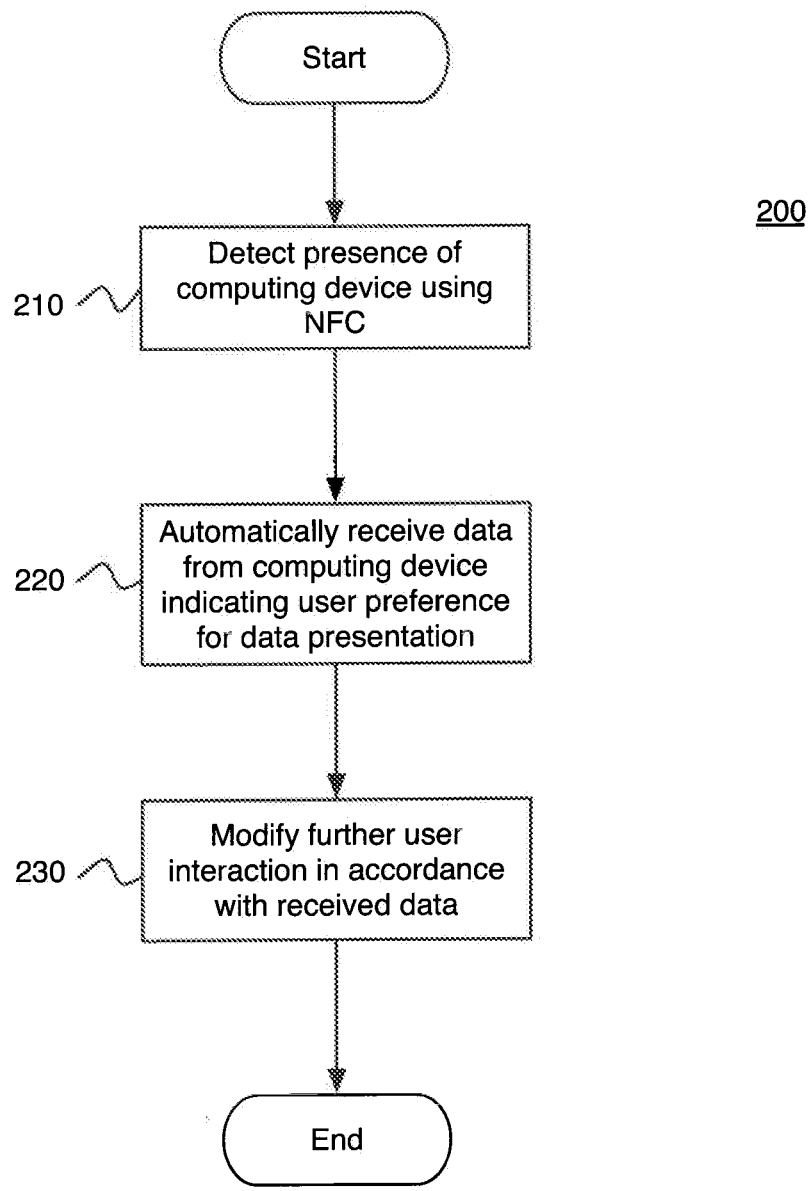
FIG. 2 is a flow diagram of a process for modifying user interaction for a transaction.

Near field communication may also be employed to modify the presentation of data to make a transaction easier for other users. For example, a colorblind user may have typical eyesight but be unable to distinguish between two colors used on an information kiosk. Similarly, a user may be slightly hearing impaired, and typically require audio to be louder on devices that use audio to convey information for a transaction. FIG. 2 is a flow diagram of a process 200 for modifying user interaction for a transaction on a client.

At block 210, the presence of a computing device may be detected using near field communication. The computing device may be, for example and without limitation, a mobile telephone or a tablet computer.

At block 220, data indicating a user preference for presentation of data may be automatically received from the computing device. For example, the data may be related to a user of the computing device. As an example, the received data may indicate that the user of the computing device is colorblind or slightly hearing impaired. The received data may also indicate that a black and white display should be used, may indicate a user's desired level of brightness or contrast of the client device display, or may indicate a desired volume level. The received data may also indicate a language preference, a text size preference, or a preferred font preference for the display.

At block 230, in accordance with the received data, further data presentation on the client may be modified in order to facilitate a transaction. In the example above, on an airport kiosk, a display that uses different colors to indicate occupied or available seats may be modified to represent levels of gray or different shading to indicate the same information. Similarly, on a client device that uses audio to present data, the volume of the audio may be increased if the data indicating a user preference for presentation of the data indicates the user is hearing impaired.

Figure 3:
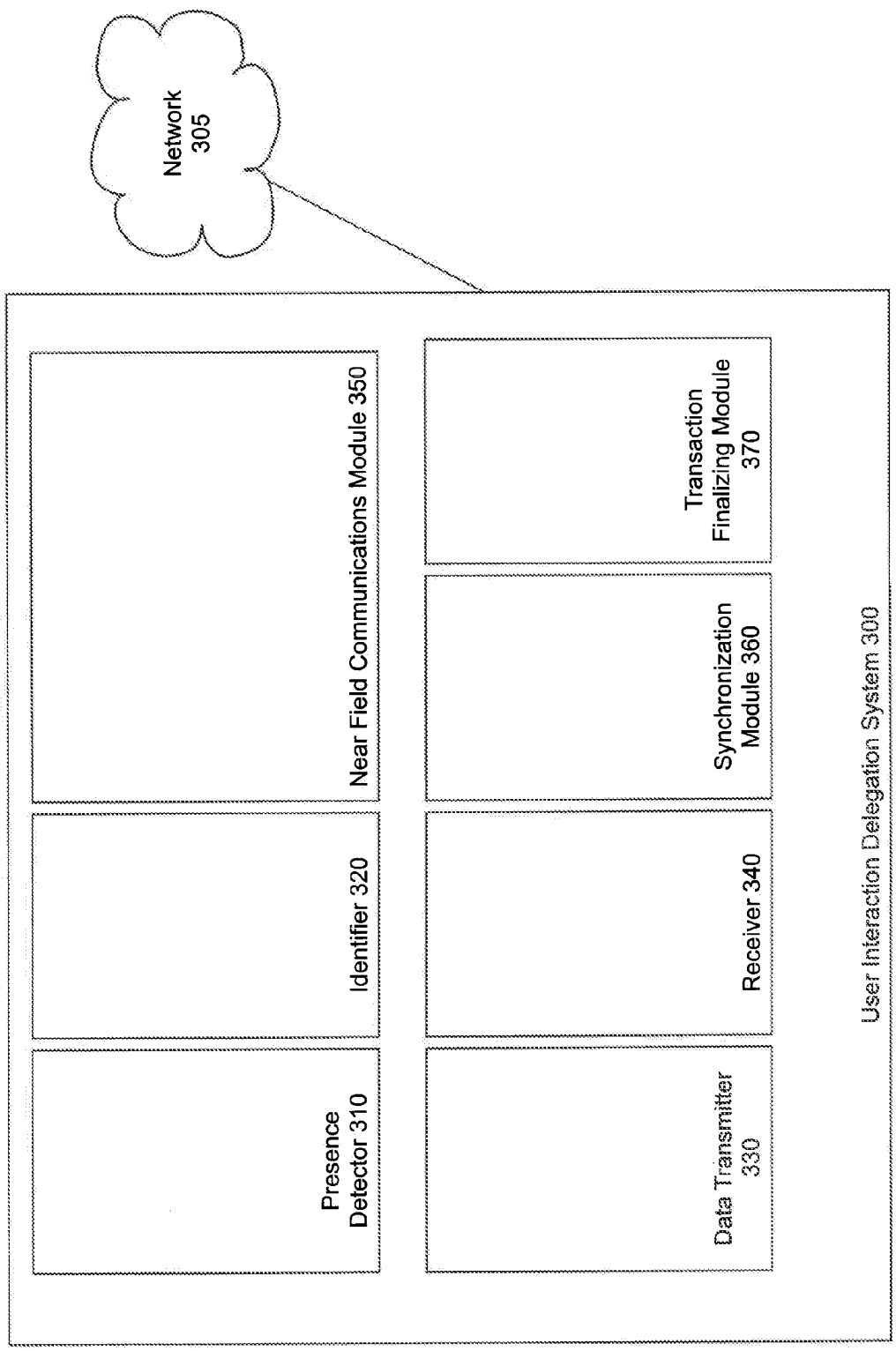
FIG. 3 is a diagram of a device for delegating user interaction for a transaction.

FIG. 3 is a diagram of an exemplary user interaction delegation system 300 that may be used in implementations disclosed herein. System 300 may be implemented, for example and without limitation, on a client device, such as a kiosk, automatic teller machine, or information station.

System 300 includes a presence detector 310 and near field communications module 350. Presence detector 310 and near field communications module 350 may detect the presence of a computing device using NFC, in accordance with block 110 of method 100 and block 210 of method 200.

System 300 may also include an identifier 320. Identifier 320 may identify a computing device detected by presence detector 310 as an assistive computing device.

System 300 may also include a data transmitter 330. Data transmitter 330 may communicate user interface data from a client device implementing system 300 to an assistive computing device, in accordance with block 130 of method 100. For example, data transmitter 330 may communicate a Uniform Resource Locator to an assistive computing device. Data transmitter 330 may operate in conjunction with near field communications module 350 to communicate user interface data over NFC. Additionally, data transmitter 330 may communicate user interface data using an electronic mail message, a text message, or other type of message.

System 300 may also include a receiver 340. Receiver 340 may operate in conjunction with near field communications module 350 to receive data from an assistive computing device, such as state data. Additionally, receiver 340 may receive data indicating a user preference for presentation of data, in accordance with block 220 of method 200. Receiver 340 may also receive a signal from an assistive computing device indicating that a transaction is complete. Receiver 340 may also receive state data or other data from a server via network 305.

System 300 may include a synchronization module 360. Synchronization module 360 may use state data received by receiver 340 to synchronize state data on a device implementing system 300.

System 300 may include a transaction finalizing module 370. Upon receiving data indicating that a transaction is complete from receiver 340, transaction finalizing module 370 may perform specific actions in accordance with an implementation of system 300. For example, transaction finalizing module 370 may print a boarding pass if system 300 is implemented in an airport kiosk. Similarly, transaction finalizing module 370 may dispense money if system 300 is implemented on an automatic teller device.

System 300 may be connected to network 305. Network 305 may be a local area network or wide area network such as the Internet. Network 305 may be wired, wireless, or a combination of the two.

Figure 4:
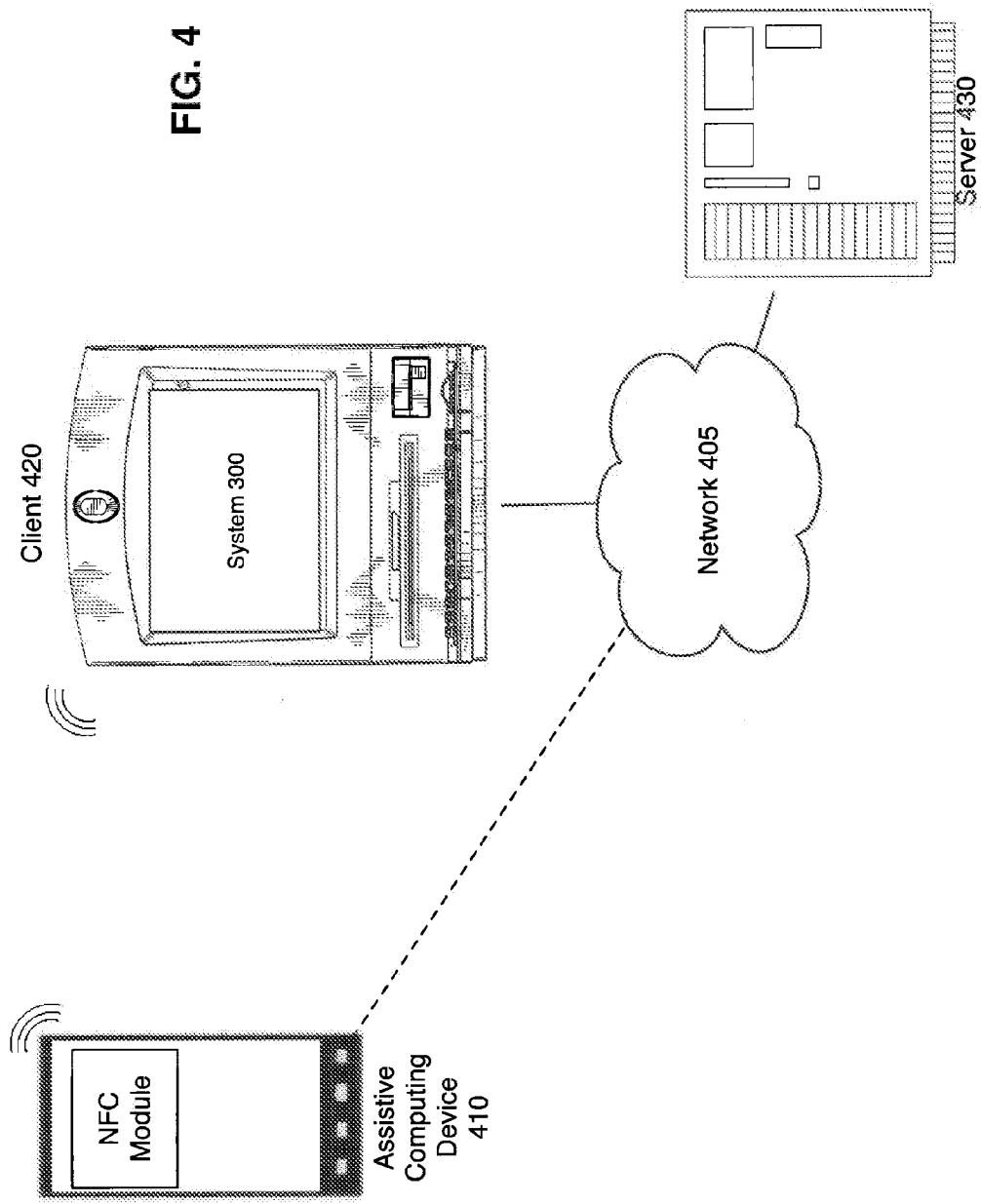
FIG. 4 is a diagram a system illustrating interaction between a user, a client and a server.

FIG. 4 is a diagram of an exemplary communication between an assistive computing device 410, a client 420, and a server 430. Client 420 may implement components of system 300, as described above. Client 420 and server 430 may be connected to each other by way of network 405. Network 405 may be a local area network or a wide area network such as the Internet.

In typical operation, a user may use client 420 to communicate with server 430 to perform a desired transaction. For example, client 420 may be an airport kiosk, and the desired transaction may be printing a boarding pass for a flight. Thus, client 420 and server 430 may communicate over network 405 to allow a user to complete the desired transaction. Server 430 may be a database server, web server, or any other type of server that communicates with client 420.

In accordance with implementations disclosed herein, a user with assistive computing device 410 may wish to perform a desired transaction as well. The user's device may be specifically tailored to the user's preferences and abilities. For example, the user's device may have screen reading software configured to the user's preferences. In order to complete the transaction using the assistive computing device, the user may pass his device near client 420 implementing system 300.

Because system 300 contains a near field communications module 350, presence detector 310, and identifier 320, client 420 may detect the user's device and recognize it as an assistive computing device in accordance with blocks 110 and 120 of method 100. For example, the assistive computing device 410 may send data to client 420 identifying itself as an assistive computing device. Additionally, client 420 may request data from assistive computing device 410 and use this data to recognize that the device is an assistive computing device.

In accordance with block 130 of method 100, data transmitter 330 of system 300 may communicate user interface data from client 420 to assistive computing device 410. The user interface data may include a URL of a website on the Internet. The assistive computing device 410 may appropriately handle the URL, and establish a connection (indicated by the dashed line) over network 405 to server 430.

The URL provided by client 420 may provide user interaction functionality to assistive computing device 410, which then may allow assistive computing device 410 to complete the desired transaction using the functionality of the assistive computing device instead of the client. For example, screen reader software on the assistive computing device may read text of an input screen to the user. Voice recognition software on the assistive computing device may allow the user to input necessary data for the transaction and advance the transaction.

User interaction delegation system 300 may be implemented in software, firmware, hardware, or any combination thereof. The user interaction delegation system 300 can be implemented to run on any type of processing device including, but not limited to, a computer, workstation, distributed computing system, embedded system, stand-alone electronic device, networked device, mobile device, set-top box, television, kiosk device, or other type of processor or computer system. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Figure 5:
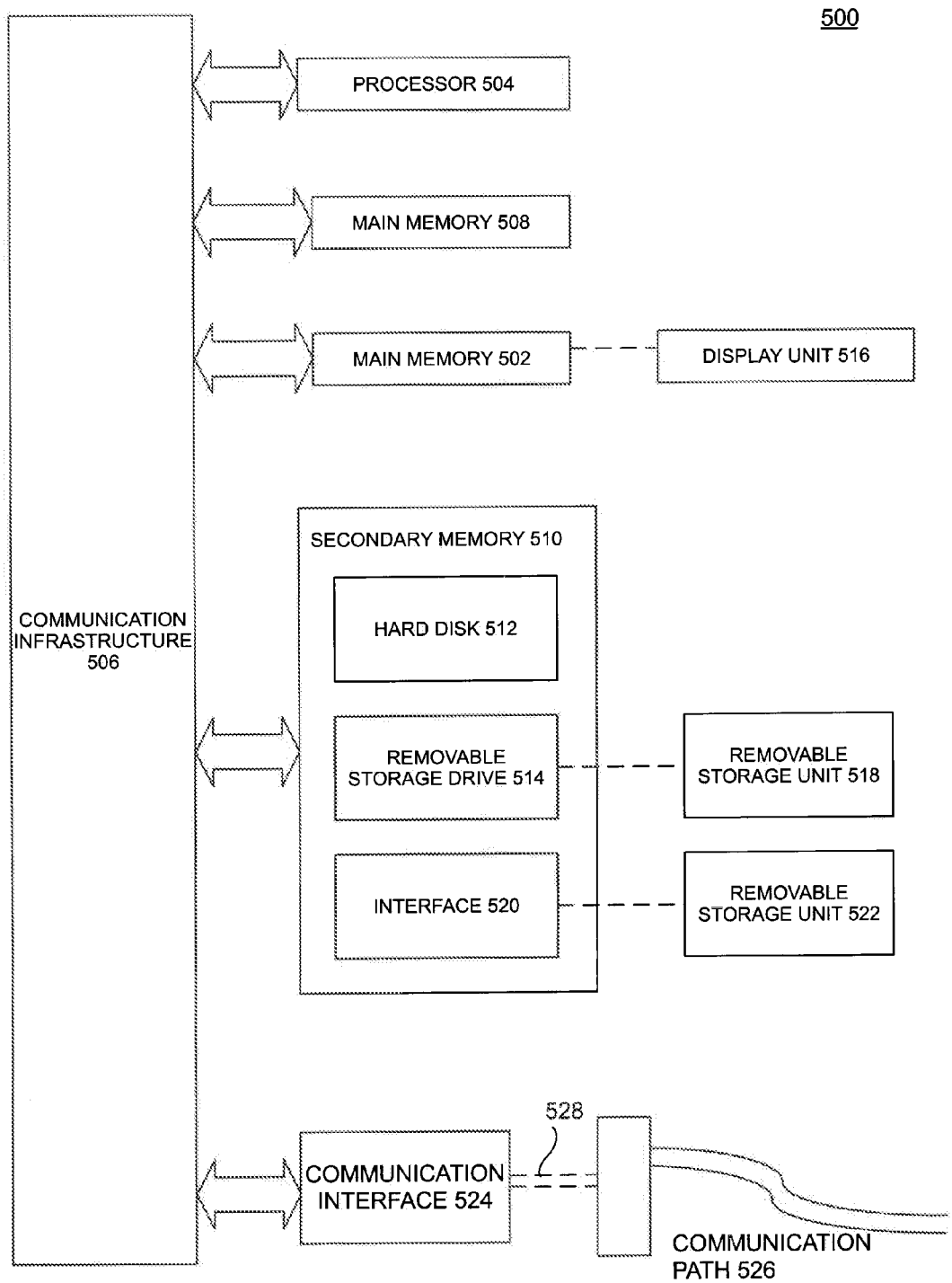
FIG. 5 is a diagram of an example computer system that can be used in implementations.

Various aspects described herein can be implemented by software, firmware, hardware, or a combination thereof. FIG. 5 illustrates an example computer system 500 in which the implementations, or portions thereof, can be implemented as computer-readable code. For example, user interaction delegation system 300 carrying out method 100 of FIG. 1 or method 200 of FIG. 2 can be implemented in system 500. Various implementations of the invention are described in terms of this example computer system 500.

Computer system 500 includes one or more processors, such as processor 504. Processor can be a special purpose or a general purpose processor. Processor 504 is connected to a communication infrastructure 506 (for example, a bus or network).

Computer system 500 also includes a main memory 508, preferably random access memory (RAM), and may also include a secondary memory 510. In accordance with implementations, user interface data may be stored, for example and without limitation, in main memory 508. Secondary memory 510 may include, for example, a hard disk drive and/or a removable storage drive. Removable storage drive 514 may include a floppy disk drive, a magnetic tape drive, an optical disk drive, a flash memory, or the like. The removable storage drive 514 reads from and/or writes to removable storage unit 518 in a well-known manner. Removable storage unit 518 may include a floppy disk, magnetic tape, optical disk, etc. which is read by and written to by removable storage drive 514. As will be appreciated by persons skilled in the relevant art(s), removable storage unit 518 includes a computer usable storage medium having stored therein computer software and/or data.

Computer system 500 may also include a main memory 502. Main memory 502 may include, for example, cache, and/or static and/or dynamic RAM. Main memory 502 may be separate from main memory 508 or may be a part thereof. Main memory 502 may be adapted to communicate with display unit 516. Display unit 516 may comprise a computer monitor or similar means for displaying graphics, text, and other data received from main memory 502. In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 are in the form of signals which may be electronic, electromagnetic, optical, or other signals capable of being received by communications interface 524. These signals are provided to communications interface 524 via a communications path 526. Communications path 526 carries signals and may be implemented using wire or cable, fiber optics, a phone line, a cellular phone link, an RF link or other communications channels.

In this document, the term "computer readable storage medium" is used to generally refer to media such as removable storage unit 518, removable storage unit 522, and a hard disk installed in hard disk drive 512. Computer readable storage medium can also refer to one or more memories, such as main memory 508 and secondary memory 510, which can be memory semiconductors (e.g. DRAMs, etc.). These computer program products are means for providing software to computer system 500.

Computer programs (also called computer control logic) are stored in main memory 508 and/or secondary memory 510. Computer programs may also be received via communications interface 524 and stored on main memory 508 and/or secondary memory 510. Such computer programs, when executed, enable computer system 500 to implement the implementations as discussed herein. In particular, the computer programs, when executed, enable processor 504 to implement the processes of the present disclosure, such as the steps in the methods discussed above. Accordingly, such computer programs represent controllers of the computer system 500. Where implementations use software, the software may be stored in a computer program product and loaded into computer system 500 using removable storage drive 514, interface 520, or hard drive 512.

Implementations may be directed to computer program products comprising software stored on any computer usable medium. Such software, when executed in one or more data processing device, causes a data processing device(s) to operate as described herein. Implementations may employ any computer useable or readable medium. Examples of non-transitory computer readable media include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.). Other computer readable media include communication mediums (e.g., wired and wireless communications networks, local area networks, wide area networks, intranets, etc.).

Aspects of the disclosure may be implemented in hardware, software, firmware, or a combination thereof. Aspects of the disclosure may be implemented via a set of programs running in parallel on multiple machines.

The summary and abstract sections may set forth one or more but not all implementations of the present disclosure, and thus, are not intended to limit the present disclosure and the appended claims.

Implementations have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific implementations will so fully reveal the general nature of the disclosure such that others can, by applying knowledge within the skill of the art, readily modify and/or adapt for various applications such specific implementations, without undue experimentation, without departing from the general concept of the disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described implementations.

What is claimed is:

1. A computer implemented method of modifying data presentation for a transaction on a client, comprising:
   detecting, by the client, the presence of a mobile computing device using near field communication;
   automatically receiving data, at the client, from the mobile computing device indicating a user preference for presentation of data; and in accordance with the received data from the mobile computing device, modifying further data presentation on the client to facilitate a transaction.

2. The method of claim 1, wherein the mobile computing device is a mobile phone.

3. The method of claim 1, wherein the received data comprises data related to a user of the mobile computing device.

4. The method of claim 1, wherein the modifying of further data presentation on the client further comprises adjusting a color of presented data.

5. The method of claim 1, wherein the modifying of further data presentation on the client further comprises adjusting a volume of presented data.

6. The method of claim 1, wherein the modifying of further data presentation on the client further comprises changing a language of presented data.

7. The method of claim 1, wherein the modifying of further data presentation on the client further comprises adjusting a text size of presented data.

8. The method of claim 1, wherein the user preference for presentation of data further comprises an indication that the user of the mobile computing device is colorblind.

9. The method of claim 1, wherein the user preference for presentation of data further comprises an indication that the user of the mobile computing device is at least slightly hearing impaired.

10. A system for modifying data presentation for a transaction on a client, comprising:
 a processor;
 a memory;
 a near field communication interface;
 a presence detector, associated with the client, that detects a presence of a mobile computing device using the near field communication interface; and
 a receiver, associated with the client, implemented on the processor, that receives data from the mobile computing device indicating a user preference for presentation of data, wherein the processor is configured to modify, in accordance with the received data, further data presentation on the client to facilitate a transaction.

11. The system of claim 10, wherein the mobile computing device is a mobile phone.

12. The system of claim 10, wherein the received data comprises data related to a user of the mobile computing device.

13. The system of claim 10, wherein the processor is configured to modify further the data presentation on the client by adjusting a color of presented data.

14. The system of claim 10, wherein the processor is configured to modify further the data presentation on the client by adjusting a volume of presented data.

15. The system of claim 10, wherein the processor is configured to modify further the data presentation on the client by changing a language of presented data.

16. The system of claim 10, wherein the processor is configured to modify further the data presentation on the client by adjusting a text size of presented data.

17. A machine-readable storage device, having stored thereon a computer program having at least one code section for modifying data presentation for a transaction on a client, the at least one code section executable by a machine for causing the machine to perform a method comprising:
 detecting the presence of a mobile computing device using near field communication;
 automatically receiving data, at the client, from the computing device indicating a user preference for presentation of data; and
 in accordance with the received data from the mobile computing device, modifying further data presentation on the client to facilitate a transaction.

18. The machine-readable storage device of claim 17, wherein the mobile computing device is a mobile telephone.

19. The machine-readable storage device of claim 17, wherein the received data comprises data related to a user of the mobile computing device.

20. The machine-readable storage device of claim 17, wherein the modifying of further data presentation on the client comprises code for adjusting a color of presented data.

21. The machine-readable storage device of claim 17, wherein the modifying of further data presentation on the client comprises code for adjusting a volume of presented data.

22. The machine-readable storage device of claim 17, wherein the modifying of further data presentation on the client comprises code for changing a language of presented data.

23. The machine-readable storage device of claim 17, wherein the modifying of further data presentation on the client comprises code for adjusting a text size of presented data.

* * * * *